US012660862B2

(12) United States Patent
Batista et al.

(10) Patent No.: US 12,660,862 B2
(45) Date of Patent: Jun. 23, 2026

(54) CLEANING TOOL WITH A TORQUE LIMITER

(71) Applicant: PHILIP MORRIS PRODUCTS S.A., Neuchatel (CH)

(72) Inventors: Rui Nuno Batista, Morges (CH); Ricardo Cali, Mannheim (DE); Antoine Zuend, Le Locle (CH)

(73) Assignee: Philip Morris Products S.A., Neuchatel (CH)

( * ) Notice: Subject to any disclaimer, the term of this patent is extended or adjusted under 35 U.S.C. 154(b) by 791 days.

(21) Appl. No.: 17/777,758

(22) PCT Filed: Nov. 27, 2020

(86) PCT No.: PCT/EP2020/083590
§ 371 (c)(1),
(2) Date: May 18, 2022

(87) PCT Pub. No.: WO2021/110548
PCT Pub. Date: Jun. 10, 2021

(65) Prior Publication Data

US 2022/0408843 A1 Dec. 29, 2022

(30) Foreign Application Priority Data

Dec. 3, 2019 (EP) ..................................... 19213279

(51) Int. Cl.
*A24F 40/85* (2020.01)
*A24F 40/20* (2020.01)
(Continued)

(52) U.S. Cl.
CPC .............. *A24F 40/85* (2020.01); *A24F 40/20* (2020.01); *A24F 40/46* (2020.01); *B08B 1/12* (2024.01); *B08B 1/165* (2024.01); *H05B 3/22* (2013.01)

(58) Field of Classification Search
CPC .......... A24F 40/85; A24F 40/46; A24F 40/20; B08B 1/165; B08B 1/12; B08B 1/30;
(Continued)

(56) References Cited

U.S. PATENT DOCUMENTS 3,574,878 A * 4/1971 Shames .................. E03C 1/302 15/104.095
4,104,757 A * 8/1978 Silverman ............... E03F 9/005 15/104.33
(Continued)

FOREIGN PATENT DOCUMENTS

CN 207479044 6/2018
DE 29617167 11/1996
(Continued)

OTHER PUBLICATIONS

4 Super Easy Ways to Clean Your Vape Tank and Gunked Up Atomizers; Ivan Srsen; Nov. 30, 1017; 7 pages. (Year: 2017).*
(Continued)

*Primary Examiner* — Linda L Gray
(74) *Attorney, Agent, or Firm* — Mueting Raasch Group

(57) ABSTRACT

The invention relates to a cleaning tool for an aerosol-generating device. The cleaning tool comprises a cleaning head and a handle. At least a part of the cleaning head is rotatably mounted in the handle. The cleaning tool further comprises at least one suspension element arranged between the cleaning head and the handle. The suspension element is arranged to engage the cleaning head or the handle to prevent relative rotation between the cleaning head and the handle, if a torque below a predetermined threshold is applied between the cleaning head and the handle. The suspension element is configured to disengage the cleaning
(Continued)

head or the handle, if a torque above a predetermined threshold is applied between the cleaning head and the handle.

18 Claims, 3 Drawing Sheets

(51) Int. Cl.

| | |
|---|---|
| ***A24F 40/46*** | (2020.01) |
| ***B08B 1/12*** | (2024.01) |
| ***B08B 1/16*** | (2024.01) |
| ***H05B 3/22*** | (2006.01) |

(58) Field of Classification Search

CPC .... B08B 1/32; B08B 2/34; B08B 1/36; B08B 1/54; H05B 3/22

See application file for complete search history.

(56) References Cited

U.S. PATENT DOCUMENTS

| | | | | |
|---|---|---|---|---|
| 6,145,514 | A | 11/2000 | Clay | |
| 6,418,938 | B1 | 7/2002 | Fleischhauer | |
| 9,468,234 | B2 | 10/2016 | Fernando | |
| 2004/0149297 | A1* | 8/2004 | Sharpe | A24F 40/85 131/194 |
| 2015/0164135 | A1 | 6/2015 | Boring | |
| 2018/0168224 | A1* | 6/2018 | Naughton | A24F 40/40 |

FOREIGN PATENT DOCUMENTS

| | | |
|---|---|---|
| EP | 0834263 | 4/1998 |
| JP | 2002-529678 | 9/2002 |
| JP | 3215374 | 3/2018 |
| KR | 1020110096548 | 8/2011 |
| WO | WO 2019/166595 | 9/2019 |
| WO | WO 2019/175099 | 9/2019 |
| WO | WO 2019/175104 | 9/2019 |
| WO | WO 2019/192371 | 10/2019 |

OTHER PUBLICATIONS

A Clean Vape Pen is a Happy Vape Pen—A Guide to Cleaing E-Juice, Wax & Dry Herb Vape Pens; Ivan Srsen; Dec. 6, 2017; 6 pages. (Year: 2017).*

English machine translation of CN 208390501 to Cho published Jan. 18, 2019; 33 pages. (Year: 2019).*

English machine translation of WO 2004092605 to Haeussermann published Dec. 2, 2003; 35 pages. (Year: 2003).*

English machine translation of WO 2014178304 published Nov. 6, 2014; to Yanagi; 50 pages. (Year: 2014).*

Office Action issued in Japan for Application No. 2022-529645 dated Mar. 23, 2023 (5 pages). English translation included.

PCT Search Report and Written Opinion for PCT/EP2020/083590 dated Feb. 2, 2021 (8 pages).

Notice of Allowance issued in Korea for Application No. 10-2022-7013968 dated Jun. 13, 2025 (5 pages). English translation included.

* cited by examiner

CLEANING TOOL WITH A TORQUE LIMITER

This application is a U.S. National Stage Application of International Application No. PCT/EP2020/083590 filed Nov. 27, 2020, which was published in English on Jun. 10, 2021, as International Publication No. WO 2021/110548 A1. International Application No. PCT/EP2020/083590 claims priority to European Application No. 19213279.3 filed Dec. 3, 2019.

The present invention relates to a cleaning tool for an aerosol-generating device. In particular, the invention relates to a cleaning tool for cleaning at least a heating element of an aerosol-generating device. The present invention further relates to a system comprising a cleaning tool and an aerosol-generating device.

Aerosol-generating articles in which an aerosol-forming substrate for generating an inhalable aerosol is heated, rather than combusted, are known in the art. An aerosol-generating article may be inserted into a cavity of the aerosol-generating device. Typically, in such heated aerosol-generating articles, an aerosol is generated by the transfer of heat from a heat source to a physically separate aerosol-forming substrate or material. The aerosol-forming substrate may be located within, around or downstream of the heat source. During use, volatile compounds are released from the aerosol-forming substrate by heat transfer from the heat source and entrained in air drawn through the aerosol-generating article. As the released compounds cool, they condense to form an aerosol.

When an aerosol-forming substrate, such as a tobacco substrate, is heated, volatile compounds are released. Aerosol evolved by the heat from the heating element may become deposited on the aerosol-generating device and in particular on a surface of the heating element. Particles of the aerosol-forming substrate itself may also become adhered to the heating element, particularly if the heating element is in direct contact with the aerosol-forming substrate. For example, a heating element in the form of a heating blade may heat a tobacco substrate to temperatures between 200 degree Celsius to 350 degree Celsius, releasing volatile compounds. Residues may collect inside the cavity of the device after use.

It is therefore desirable to periodically clean the heating element and the cavity in which or around which the heating element is located. Such periodical cleaning to remove particles and compounds adhered to and deposited on the heating element or in the cavity of an aerosol-generating device may ensure optimal performance of the aerosol generating device. Cleaning of the heating element and maintaining tidy conditions in the cavity allow for optimal flavour sensation of the aerosol.

A cleaning tool usually comprises a cleaning head that relies on physical contact to remove residue from the heating elements or the cavity. During operation, a user may insert the cleaning head of the cleaning tool into the cavity. Movement of the cleaning head may result in a cleaning action of one or both of the cavity and the heating element. A potential disadvantage is that rotation of the cleaning tool may damage elements of the aerosol-generating device, for instance, the heating element. This is particularly true for the heating element being substantially blade shaped with a tapered end for insertion into an aerosol-forming substrate. Such a heating blade has a greater width dimension than its thickness dimension. The thickness of the blade preferably is usually between about 0.2 mm to 0.5 mm, to facilitate its insertion into an aerosol-forming substrate. In comparison to a pin structure, such a thin flat blade can be very vulnerable to damage by the excessive torsion transferred by the cleaning tool, especially when an excessive torque is used on the cleaning tool upon the cleaning operation.

It would be desirable to have a cleaning tool optimizing cleaning. It would be desirable to have a cleaning tool that prevents damaging of elements of the aerosol-generating device, particularly of the heating element, during the use of the cleaning tool.

According to an embodiment of the invention there is provided a cleaning tool for an aerosol-generating device. The cleaning tool comprises a cleaning head and a handle. At least a part of the cleaning head is rotatably mounted in the handle. The cleaning tool further comprises at least one suspension element arranged between the cleaning head and the handle. The suspension element is arranged to engage the cleaning head with the handle to prevent relative rotation between the cleaning head and the handle, if a torque below a predetermined threshold is applied between the cleaning head and the handle. The suspension element is configured to disengage the cleaning head from the handle, if a torque above a predetermined threshold is applied between the cleaning head and the handle.

With the cleaning tool according to the present invention, damage to a heating element of an aerosol-generating device that is cleaned with the cleaning tool can be prevented. Particularly, if the cleaning tool is inserted into the cavity that is configured for receiving an aerosol-generating article comprising aerosol-forming substrate, the cleaning tool may be configured to clean one or both of the cavity or the heating element arranged within the cavity. During a cleaning operation, a user may rotate the cleaning tool against a heating element, thereby applying a turning effect (namely a torque) on the heating element. The torque increases when the width dimension of the heating element increases, because the distance between the edge(s) of the heating element and the central axis of the heating element (namely the momentum arm) increases. Thus a heating element in the form of a blade is more susceptible to damage from a torsion force than a heating element in the form of a pin or needle. With the cleaning tool according to the present invention, if the torque applied by the user for rotating the cleaning tool is above the predetermined threshold, the suspension element will disengage the cleaning head with the handle such that the cleaning head will uncouple from the handle and the handle can rotate relative to the cleaning head. As a consequence, the high torque applied by the user to the handle is no longer transferred to the cleaning head to make the cleaning head rotating. Thus, the torque applied on the heating element is limited and can not exceed the predetermined threshold. And the risk of damaging the cleaning head is therefore reduced.

The handle may have a cylindrical shape. The handle may have a hollow cylindrical shape. The handle may have a sidewall. The sidewall may comprise an outer surface to be gripped by a user. The outer surface may be configured with increased friction. The outer surface may comprise protrusions and grooves or any other known means for increasing friction when gripped by a user to facilitate the rotating operation. The handle may be open at one end. This open end may be an open distal end. The open end may be configured for receiving the cleaning head. The open end may be arranged at a distal end of the handle. Opposite the open end, the proximal end of the handle may be closed.

The term 'distal' refers to a direction of use of the cleaning tool. The end of the cleaning tool that is inserted into the cavity of the aerosol-generating device is the distal end of the cleaning tool. The term 'proximal' refers to a direction opposite to the 'distal' direction. The end of the cleaning tool held by the user or pointing towards the user is the proximal end of the cleaning tool.

The cleaning head may have a cylindrical shape. The outer diameter of the cleaning head may correspond to or be slightly smaller than the inner diameter of the hollow cylindrical handle. At least a proximal portion of the cleaning head mounted within the handle may have an outer diameter corresponding to or being slightly smaller than the inner diameter of the hollow cylindrical handle. A distal portion of the cleaning head may be configured to be inserted into the cavity of the aerosol-generating device. The distal portion of the cleaning head may extend beyond the open end of the handle. The distal portion of the cleaning head may be dimensioned to fit into the cavity of the aerosol-generating device. When the cleaning tool is used for cleaning the aerosol-generating device and the distal portion of the cleaning head is inserted into the cavity of the aerosol-generating device, the proximal portion of the cleaning head mounted within the handle of the cleaning tool may stick out of the cavity of the aerosol-generating device. The user may grip the handle of the cleaning tool for using the cleaning tool.

The torque may also denote the turning effect applied by a user. The torque is proportional to the magnitude of the force applied by a user to the handle of the cleaning tool in a tangential direction, since the torque is the product of the torsion force multiplied by the perpendicular distance of the line of action of force from the axis of rotation. Particularly, the cleaning head may be held within the cavity of the aerosol-generating device after insertion of the cleaning head into the cavity. The cleaning head may exemplarily be held by the complementary shapes of the cleaning head and the cavity. The torque may particularly denote the turning effect applied on the cleaning head, when the user applies a tangential force to the handle during gripping of the handle and operation of the cleaning tool.

The predetermined threshold of the torque between the handle and the cleaning head may be between 3 centinewton meter (cN,m) and 27 cN·m, preferably between 9 cN·m and 17 cN·m. The first predetermined threshold preferably prevents damaging of the heating element if a torque is applied by a user to the handle of the cleaning tool.

Generally, the suspension element may take any suitable forms of a torque limiter to create an engagement between the cleaning head and the handle, such as a magnetic torque limiter, a ball detent type limiter or a pawl and spring type limiter. Preferably, the suspension element may comprise a resilient element. The resilient element may preferably be configured as a spring. The suspension element may be configured as a spring. The resilient element may comprise a resilient material such as for example rubber.

The resilient element may be configured for engaging one or both of the handle and the cleaning head of the cleaning tool. The resilient element may be configured to engage the handle with the cleaning head, if the torque below the predetermined threshold is applied between the cleaning head and the handle. The resilient element may likewise be configured to engage the handle with the cleaning head, if no torque is applied between the cleaning head at the handle. The resilient element may be configured to disengage the handle from the cleaning head if the torque above the predetermined threshold is applied between the cleaning head and the handle. Disengagement of the resilient element may uncouple the cleaning head from the handle and to allow relatively rotation between the handle and the cleaning head. Namely, disengagement of the resilient element allows the handle alone to rotate with respect to the cleaning head. By doing so, the torque applied by the user on the handle is no longer transferred to the cleaning head.

The cleaning tool may comprise at least two suspension elements. The cleaning tool may comprise more than two suspension elements. The cleaning tool may comprise multiple suspension elements.

The suspension elements may be arranged circumferentially surrounding a proximal end of the cleaning head. The proximal end of the cleaning head may be arranged at the end of the proximal portion of the cleaning head. The circumferential surrounding arrangement of the suspension elements may allow a secure engagement between the handle and the cleaning head. This arrangement may support a uniform transfer of the torque applied by the user to the suspension elements.

The two suspension elements may be arranged radially opposite of each other. If more than two suspension elements are provided, preferably the suspension elements are evenly spaced from each other in a circular arrangement around the proximal end of the cleaning head. If pairs of suspension elements are provided, preferably the pairs of suspension elements may be arranged opposite each other.

One or both of the cleaning head and the handle may comprise at least one cavity. The suspension element may be configured to engage with the cavity. Engagement provided the suspension element between the cleaning head and the handle may be facilitated by the suspension element engaging the cavity. Exemplarily, the cleaning head may comprise a cavity and the suspension element may be mounted on the handle or integrally formed with the handle. When the suspension element engages the cavity, an engagement between the handle and the cleaning head is facilitated. Alternatively, the handle may comprise a cavity and the suspension element may be mounted on the cleaning head or integrally formed with the cleaning head. Likewise, when the suspension element engages the cavity according to this alternative arrangement, an engagement between the handle and the cleaning head is facilitated.

A cavity in one or both of the handle and the cleaning head is one option for facilitating engagement of the suspension element. Any other known structure such as a protrusion or groove may alternatively be utilized for facilitating engagement of the suspension element. Generally, the suspension element may be an element separate from the handle and the cleaning head. The suspension elements may be mounted in the handle and configured to engage a corresponding structure, such as the cavity, in the cleaning head. Alternatively or in addition, the suspension elements may be mounted in the cleaning head and configured to engage the corresponding structure, such as the cavity, in the handle. As a further alternative, the suspension element may be integrally formed with the handle and configured to engage the corresponding structure of the cleaning head or vice versa.

If at least two suspension elements are provided, the corresponding number of the corresponding engaging structures may be provided. Exemplarily, if two suspension elements are provided, two cavities may be provided for engagement with the two suspension elements. The corresponding engaging structures are preferably arranged such that all suspension elements are engaged with the corresponding structures at the same time. Consequently, all suspension elements preferably disengage the corresponding engaging structures at the same time if the applied torque exceeds the predetermined threshold.

Alternatively, the number of the provided corresponding engaging structures may be more than the number of the suspension elements. For instance, when two suspension elements are provided, two or more cavities, such as, eight cavities (as shown in FIG. 2) may be provided for engagement. The number of suspension elements to be provided may well depend on the desired torque threshold to be predetermined. By setting the desired torque threshold, the torque which may be transferred from the handle of the cleaning tool to the cleaning head is limited. Thus, an excess torsion loaded on the heating element may be avoided and the risk of the damages of the heating element is reduced.

The at least two suspension elements may be configured to engage neighbouring corresponding engaging structures after disengagement from the initial corresponding engaging structures. The suspension elements and the corresponding structures may be configured similar to a torque wrench. A user will have an immediate haptic or auditory feedback if the torque applied to the handle exceeds the predetermined threshold. For instance, the user may have a sensation of less mechanical resistance upon rotating the cleaning handle due to the uncoupling of the cleaning head from the handle and the relative movement between the cleaning head and the handle. Alternatively or in addition, the user may receive an audio indication, such as a click sound, when the suspension elements start to engaging the subsequent neighbouring corresponding engaging structure after a small rotation. In this case, the handle will disengage for a short time from the cleaning head and, after a small rotation, engage with the cleaning head again. If the user maintains the high torque, the handle will rotate around the cleaning head, while the cleaning head maintains static until the user applies a torque below the predetermined threshold so that the handle can engage with the cleaning head again via the suspension elements. Consequently, the torque applied on the handle by the user starts be transferred to the cleaning head to drive the cleaning head to rotate for cleaning the heating cavity and the heating element of the aerosol-generating device.

The cleaning head may comprise side taps rotationally mounted in grooves of the handle. Alternatively, the handle may comprise side taps rotationally mounted in grooves of the cleaning head. The side taps may be configured as protrusions. The side taps may engage in the grooves. The engagement between the side taps and the grooves may facilitate the mounting of the cleaning head within the handle. The side taps may be arranged circumferentially around the outer circumference of the cleaning head, preferably around the proximal portion of the cleaning head. Correspondingly, the grooves of the handle may be arranged circumferentially around the inner sidewall of the hollow cylindrical handle. Engagement between the side taps and the grooves may ensure the proximal portion of the cleaning head to be securely mounted within the handle. In the meanwhile, the engagement between the side taps and the grooves also enable a free rotation between the handle and the cleaning head. The rotation is only limited, as described herein, by means of the suspension element and the engagement of the suspension element with one or both of the handle and the cleaning head. The engagement between the side taps and the grooves preferably ensures the coaxial alignment of the handle and the cleaning head. The engagement between the side taps and the grooves preferably prevents axial movement between the handle and the cleaning head. As a consequence, the cleaning head is securely mounted within the handle, while rotation between the cleaning head at the handle is enabled.

The cleaning head may comprise cleaning means, preferably brushes or wipers. The cleaning means may be arranged adjacent the distal end of the cleaning head. The cleaning means may be extended beyond the open distal end of the handle. The cleaning means may be arranged adjacent the open distal portion of the cleaning head. The cleaning means may be arranged on the surface of the cleaning head, preferably on the surface of one or both of a distal end face of the cleaning head and an outer circumference of the distal portion of the cleaning head.

The handle may comprise a central raised area at a proximal inner wall for engagement with a corresponding central notch in a proximal end face of the cleaning head. Alternatively, the handle may comprise a central notch at a proximal inner wall for engagement with a corresponding central raised area in a proximal end face of the cleaning head. A proximal wall of the handle may be the closed end of the handle as described herein. The proximal wall may comprise a proximal outer wall facing the outside of the handle, preferably constituting the proximal end face of the handle. The proximal inner wall may face the hollow interior of the handle. The proximal inner wall faces the cleaning head mounted within the handle. The engagement between the central raised area at the proximal inner wall of the handle and the corresponding central notch in the proximal end face of the cleaning head may optimize the mounting of the cleaning head within the handle. Particularly, engagement may prevent or reduce radial movement of the cleaning head within the handle.

One or both of the cleaning head and the handle may be elongate. The cleaning tool may be elongate. One or more of the cleaning head, the handle and the cleaning tool may comprise a longitudinal central axis. Preferably, the longitudinal central axis of the cleaning head, the handle and the cleaning tool are identical. That is, the cleaning head and the handle are co-axially aligned. Such a co-axial alignment between the cleaning head and the handle may be ensured by the side taps and the grooves structures as described above. The end of the elongate cleaning tool to be inserted into the cavity of the aerosol-generating device is the distal end of the cleaning tool and the end of the elongate cleaning tool held by the user as the proximal end of the cleaning tool.

One or more of the cleaning means, the distal end face and the circumference of the distal portion of the cleaning head may comprise a scraping surface. A scraping surface is a surface that is configured for scraping, caressing, brushing, swabbing or otherwise exercising a cleaning action to a surface of the aerosol-generating device.

One or both of the handle and the cleaning head may be made from one or both of metallic material or plastic material, preferably from hard plastic material. The cleaning means may comprise a flexible cleaning element made of a flexible material for wiping the heating element of the aerosol-generating device. The flexible cleaning element may be made of thermoplastic elastomers (TPE), such as one or more of ARNITEL, HYTREL, DRYFLEX, MEDIPRENE, KRATON, PIBIFLEX, SOFPRENE, and LAPRENE.

The cleaning head may have any suitable shape which can enable the cleaning head to be inserted into the cavity of the aerosol-generating device. Preferably, the cleaning head is substantially cylindrical. That is, preferably the cleaning head has a substantially circular cross-sectional shape. This can be advantageous for a number of reasons. For example, since aerosol-generating articles are generally cylindrical, the cavity of the aerosol-generating device configured to receive an aerosol-generating article is often also generally cylindrical. Thus, having a cylindrical shape may ensure a complementary accommodation of the cleaning head within the cavity of the aerosol-generating device. Such a complementary shape configuration between the cleaning head and the cavity of the aerosol-generating device may improve the cleaning efficiency of the cleaning tool.

The cleaning head, more preferably the distal portion of the cleaning head, may have a length of between 40 millimeters and 60 millimeters, more preferably of 50 millimeters. The cleaning head, more preferably the distal portion of the cleaning head, may have a diameter of between 6 millimeters and 11 millimeters, more preferably of 10 millimeters.

The invention further relates to a system comprising a cleaning tool as described herein and an aerosol-generating device. The aerosol-generating device comprises a cavity configured to receive an aerosol-generating article comprising aerosol-forming substrate. The aerosol-generating device comprises a heating element arranged within the cavity. The cleaning head of the cleaning tool is configured to be inserted into the cavity of the aerosol-generating device for cleaning of one or more of the cavity and the heating element.

For cleaning one or both of the cavity and the heating element, the cleaning tool is at least partially inserted into the cavity. More particularly, the distal portion of the cleaning head is inserted into the cavity for the cleaning operation. The proximal portion of the cleaning head sticks out of the cavity. Since the proximal portion of the cleaning head is mounted within the handle, the handle is not inserted into the cavity. After insertion of the proximal portion of the cleaning head into the cavity, the handle may lie flush against the aerosol-generating device. For the cleaning operation, the user may grip and twist the handle to rotate the distal portion of the cleaning head within the cavity. The user may move the cleaning tool up-and-down, that is, slightly out of the cavity and back into the cavity, for scraping off unwanted residues from one or more of the sidewall of the cavity, the base of the cavity and the heating element.

The heating element may be configured as an internal heating element. The heating element may be arranged within the cavity. The heating element may be arranged centrally within the cavity. The heating element may be elongate. The heating element may be a resistive heating element. The cleaning tool, more preferably the cleaning head of the cleaning tool, may comprise a recess. The cleaning element may slot into the recess, when the cleaning head of the cleaning tool is inserted into the cavity.

The heating element may be configured as a blade-shaped heating element. During the cleaning operation, the torque applied by the user to the handle may result in the torque applied to the blade-shaped heating element. If the torque exceeds the predetermined threshold, the blade-shaped heating element may be damaged. As a consequence, the cleaning tool is configured, as described herein, such that the torque applied by the user above the predetermined threshold will not be transferred to the cleaning head. Therefore, even if a user applies the torque to the handle above the predetermined threshold, the handle will not transfer this torque to the cleaning head. Thus, the torque will not be transferred to the heating element so that the risk of damaging the heating element, particularly if the heating element is configured as a blade-shaped heating element, is reduced. The cleaning head of the cleaning tool may be configured as disclosed in WO2019/166595A1, particularly in FIG. 1 with the associated description thereof.

Features described in relation to one embodiment may equally be applied to other embodiments of the invention.

The invention will be further described, by way of example only, with reference to the accompanying drawings in which.

Figure 1:
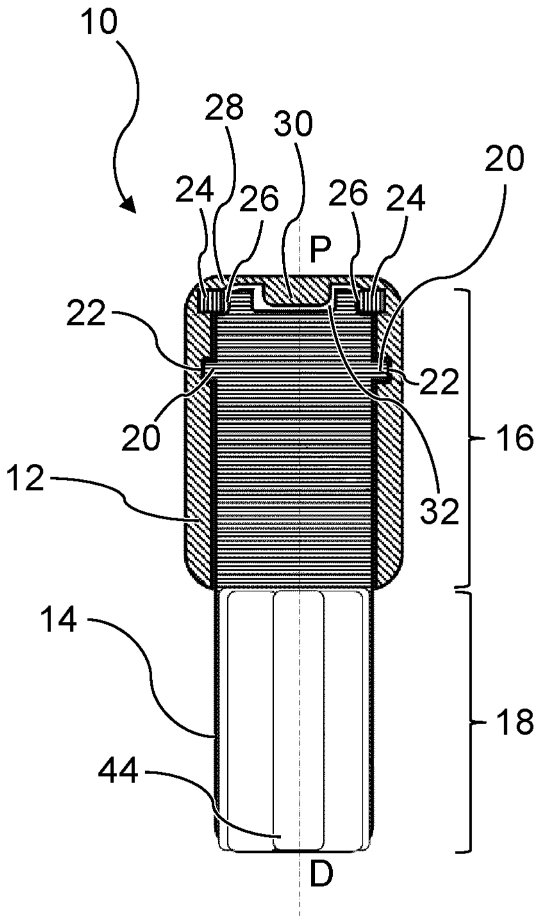
FIG. 1 shows an illustrative cross-sectional side view of a cleaning tool.

FIG. 1 shows a cleaning tool 10 for an aerosol-generating device 34. The aerosol-generating device 34 shown in FIG. 3. The cleaning tool 10 comprises a handle 12. The cleaning tool 10 further comprises a cleaning head 14. The cleaning tool 10 comprises a proximal end P and a distal end D. The cleaning head 14 is mounted within the handle 12. More particularly, a proximal portion 16 of the cleaning head 14 is mounted within the handle 12, while a distal portion 18 of the cleaning head 14 protrudes from the handle 12.

For mounting the proximal portion 16 of the cleaning head 14 within the handle 12, the cleaning head 14 comprises side taps 20. The side taps 20 are arranged circumferentially on the circumference of the proximal portion 16 of the cleaning head 14. The side taps 20 are configured to engage with corresponding grooves 22 of the handle 12. Alternatively, the handle 12 comprises side taps 20 and the cleaning head 14 comprises corresponding grooves 22. The side taps 20 engaged the grooves 22 such that the cleaning head 14 can freely rotate within the handle 12. Additionally, the side taps 20 engaging the grooves 22 prevent axial movement of the cleaning head 14 relative to the handle 12.

Figure 2:
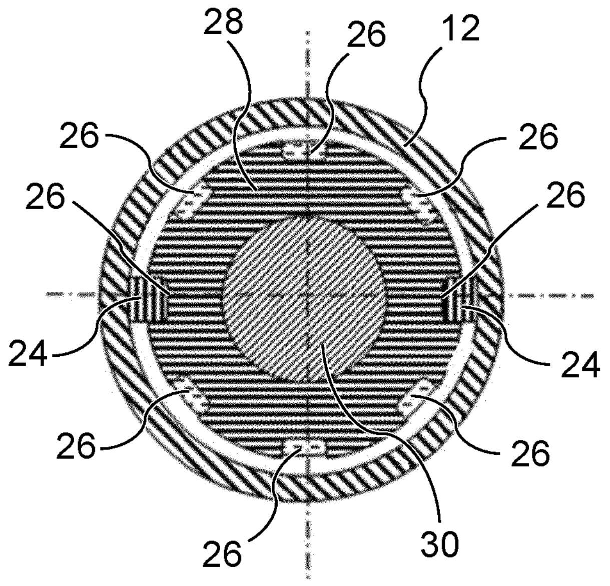
FIG. 2 shows an illustrative cross-sectional top view of the cleaning tool.

For preventing rotation between the handle 12 and the cleaning head 14, a suspension element 24 is provided. The suspension element 24 may be configured as a single suspension element 24. Alternatively, multiple suspension elements 24 may be provided. The suspension element 24 is configured as a resilient element such as a spring or a rubber-containing material. The suspension element 24 is configured to engage the handle 12 with the cleaning head 14. In the embodiment shown in FIG. 1, the suspension element 24 is configured to engage with the cleaning head 14. More particularly, the suspension element 24 is configured to engage with a cavity 26 of the cleaning head 14. In FIG. 1, two suspension elements 24 and two cavities 26 are depicted. As can be seen in FIG. 2, two suspension elements 24 are provided and configured to engage with corresponding multiple cavities 26. As depicted in FIG. 1, the suspension element 24 is provided separate from the handle 12 and the cleaning head 14. The suspension element 24 is preferably mounted in the handle 12. Alternatively, the suspension element 24 can be integrally formed with the handle 12. As a further alternative embodiment, the suspension element 24 is mounted on the cleaning head 14 or integrally formed with the cleaning head 14 and the handle 12 comprises corresponding cavities 26. The suspension elements 24 are arranged circumferentially around a proximal end face of the proximal portion 16 of the cleaning head 14.

FIG. 1 further shows that the handle 12 has a closed proximal wall 28 at a proximal end. At an inner wall of the proximal wall 28, a central raised area 30 or protrusion is provided. The central raised area 30 is configured to engage in a notch 32 of the cleaning head 14. The notch 32 of the cleaning head 14 is provided in a proximal end face of the proximal portion 16 of the cleaning head 14. The engagement between the central raised area 30 of the handle 12 and the notch 32 of the cleaning head 14 prevents a radial movement between the cleaning head 14 and the handle 12. By means of the engagement between the side taps 20 and the grooves 22 as well as the engagement between the central raised area 30 and the notch 32, the cleaning head 14 is securely and rotatably mounted within the handle 12.

FIG. 2 shows a top cross-sectional view of the cleaning tool 10. Multiple cavities 26 are depicted for engagement with the suspension elements 24. The engagement between the suspension elements 24 and the cavities 26 is configured such that rotation between the handle 12 and the cleaning head 14 is prevented, if a torque below a predetermined threshold is applied to the handle 12 relative to the cleaning head 14. In this case, the engagement between the suspension elements 24 and the cavities 26 is sufficiently strong to overcome the applied torque and keep the coupling between the handle 12 and the cleaning head 14 such that the handle 12 does not rotate with respect to the cleaning head 14. If the torque applied to the handle 12 relative to the cleaning head 14 exceeds the predetermined threshold, the suspension elements 24 are configured to disengage the initial cavities 26. As a consequence, the handle 12 will rotate for a small amount until the suspension elements 24 engage with the cavities 26 that neighbour the initial cavities 26. In other words, the handle 12 and the cleaning head 14 function similar to a torque wrench, in which a predetermined torque is exceeded. Preferably, this functionality is independent from the tangential direction of the torque applied to the handle 12.

Figure 3:
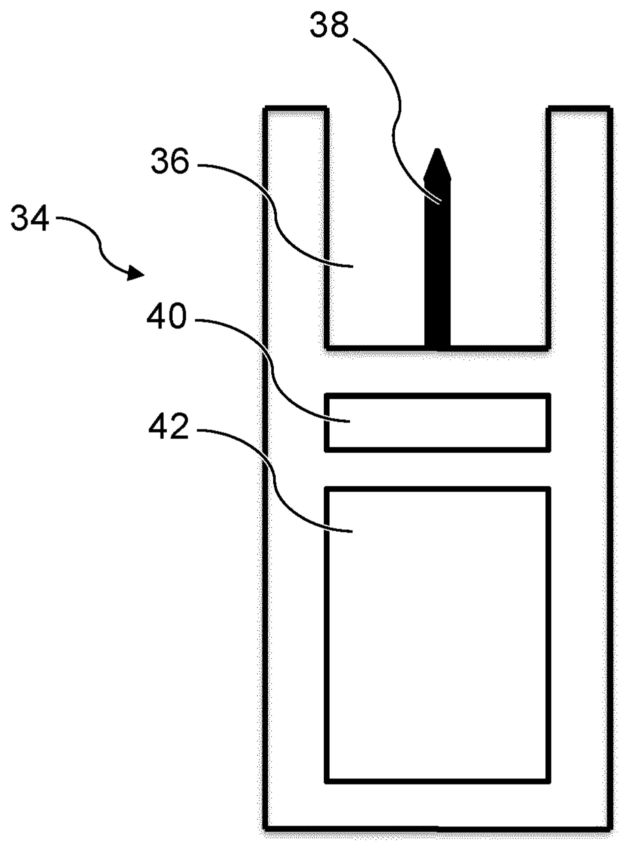
FIG. 3 shows an illustrative cross-sectional side view of an aerosol-generating device.

FIG. 3 shows an illustrative aerosol-generating device 34. The aerosol-generating device 34 comprises a cavity 36. The cavity 36 is configured to receive an aerosol-generating article comprising aerosol-generating substrate. Centrally arranged within the cavity 36, a heating element 38 is depicted. The heating element 38 is preferably configured as a blade-shaped heating element 38. The aerosol-generating device 34 further comprises a controller 40 for controlling supply of electrical power from a power supply 42 to the heating element 38.

When the aerosol-generating article is depleted, the aerosol-generating article is removed from the cavity 36 and a fresh aerosol-generating article is inserted into the cavity 36. Between removal of the depleted aerosol-generating article and insertion of a fresh aerosol-generating article, a user may wish to clean one or more of the inner sidewall of the cavity 36, the base of the cavity 36 and the heating element 38. For this purpose, the user may employ the cleaning tool 10 according to the present invention. More particularly, the user may insert the distal portion 18 of the cleaning head 14 into the cavity 36. The distal portion 18 of the cleaning head 14 may comprise a slid-shaped recess 44 (shown in FIG. 1) to accommodate the blade-shaped heating element 38, when the distal portion 18 of the cleaning head 14 is inserted into the cavity 36. The distal portion 18 of the cleaning head 14 may be dimensioned to fit into the cavity 36. During insertion and removal of the distal portion 18 of the cleaning head 14, unwanted residues may be scraped off of one or more of the inner sidewall of the cavity 36, the base of the cavity 36 and the heating element 38. During use, a user may potentially apply a torque to the handle 12 of the cleaning tool 10. If this torque exceeds the predetermined torque, the heating element 38 may potentially be damaged, if the torque is transmitted to the heating element 38. For this reason, the cleaning tool 10 according to the present invention is employed, in which the handle 12 rotates relative to the cleaning head 14, if the torque applied to the handle 12 by the user exceeds the predetermined threshold. As a consequence, this torque exceeding the predetermined threshold is not transmitted to the cleaning head 14 and to the heating element 38 from the handle 12. Thus, damage to the heating element 38 is prevented.

The invention claimed is:

1. A cleaning tool for an aerosol-generating device, the cleaning tool comprises a cleaning head and a handle, wherein at least a part of the cleaning head is rotatably mounted in the handle, wherein the cleaning tool further comprises a torque limiter arranged between the cleaning head and the handle, wherein the torque limiter engages the cleaning head with the handle to prevent relative rotation between the cleaning head and the handle if a torque below a predetermined torque threshold is applied between the cleaning head and the handle, and wherein the torque limiter is configured to disengage the cleaning head from the handle if a torque above the predetermined torque threshold is applied between the cleaning head and the handle, wherein the cleaning head comprises cleaning brushes or wipers, wherein the cleaning brushes or wipers are arranged adjacent a distal end of the cleaning head and wherein the cleaning brushes or wipers are extended beyond a distal end of the handle.

2. The cleaning tool according to claim 1, wherein the torque limiter comprises a resilient element.

3. The cleaning tool according to claim 1, wherein the cleaning tool comprises at least two torque limiters.

4. The cleaning tool according to claim 3, wherein the at least two torque limiters are arranged circumferentially on an inner wall of the handle.

5. The cleaning tool according to claim 3, wherein the at least two torque limiters are arranged radially opposite of each other.

6. The cleaning tool according to claim 1, wherein one or both of the cleaning head and the handle comprises at least one cavity, and wherein the torque limiter is configured to engage with the cavity.

7. The cleaning tool according to claim 6, wherein at least two cavities are provided.

8. The cleaning tool according to claim 1, wherein the cleaning head is cylindrical.

9. The cleaning tool according to claim 1, wherein the handle has a hollow cylindrical shape with a distal open end for mounting at least a part of the cleaning head and an opposite proximal closed end.

10. The cleaning tool according to claim 1, wherein the cleaning head comprises side taps rotationally mounted in grooves of the handle or wherein the handle comprises side taps rotationally mounted in grooves of the cleaning head.

11. The cleaning tool according to claim 1, wherein the handle comprises a central raised area at a proximal inner wall for engagement with a corresponding central notch in a proximal end face of the cleaning head or wherein the handle comprises a central notch at a proximal inner wall for engagement with a corresponding central raised area in a proximal end face of the cleaning head.

12. A system comprising the cleaning tool according to claim 1 and an aerosol-generating device, wherein the aerosol-generating device comprises a cavity configured to receive an aerosol-generating article comprising aerosol-forming substrate, wherein the aerosol-generating device comprises a heating element arranged within the cavity, and wherein the cleaning head of the cleaning tool is configured to be inserted into the cavity of the aerosol-generating device for cleaning of one or more of the cavity and the heating element.

13. The system according to claim 12, wherein the heating element is configured as a blade-shaped heating element, wherein the heating element has a bigger width dimension than its thickness.

14. The cleaning tool according to claim 1, wherein the predetermined torque threshold is between 9 cN·m and 17 cN·m.

15. The cleaning tool according to claim 1, wherein the torque limiter is configured as a spring.

16. The cleaning tool according to claim 7, wherein the cavities are arranged circumferentially surrounding a proximal end of the cleaning head.

17. The system according to claim 13, wherein the blade-shaped heating element has a tapered end.

18. The cleaning tool according to claim 1, wherein the predetermined torque threshold is between 3 centinewton meter (cN·m) and 27 cN·m.

* * * * *